(No Model.)   3 Sheets—Sheet 1.
J. C. SHEA.
METHOD OF AND DIE FOR MAKING CRANK AXLES.
No. 454,073.   Patented June 16, 1891.
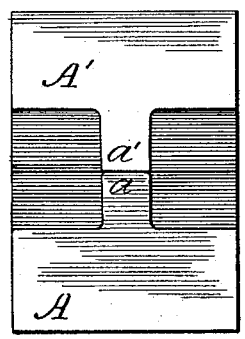
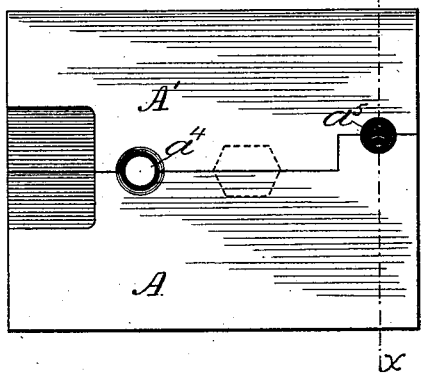
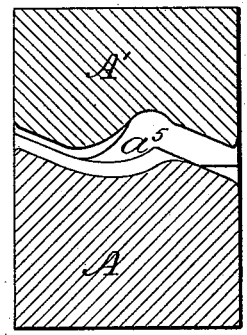
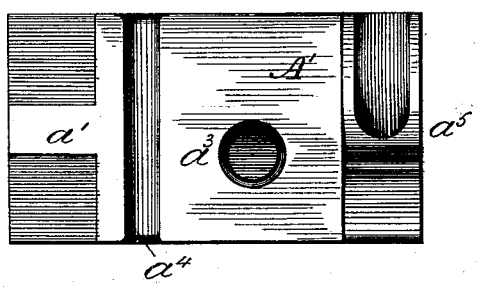
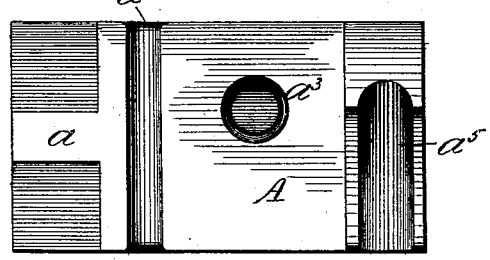
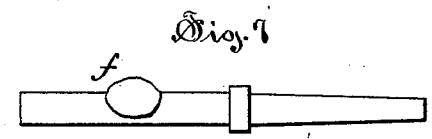
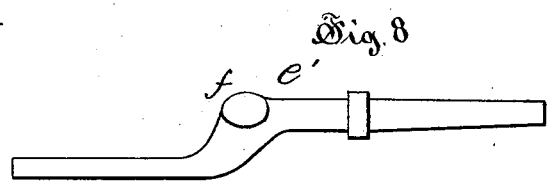
Witnesses:
Harry R. Williams.
A. B. Jenkins
Inventor,
John C. Shea
by Simonds & Burdett,
attys.
THE NORRIS PETERS CO., PHOTO-LITHO., WASHINGTON, D. C.

(No Model.) 3 Sheets—Sheet 2.
J. C. SHEA.
METHOD OF AND DIE FOR MAKING CRANK AXLES.
No. 454,073. Patented June 16, 1891.
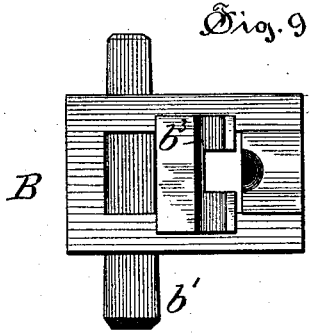
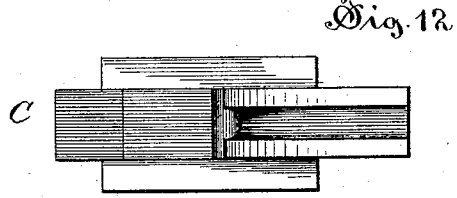
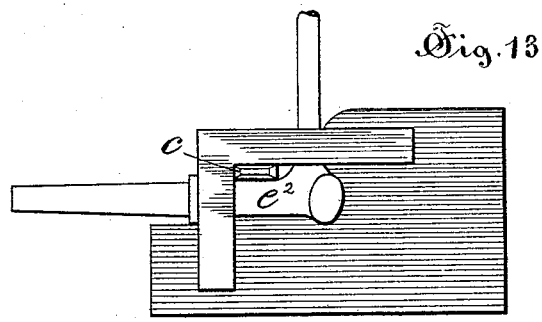
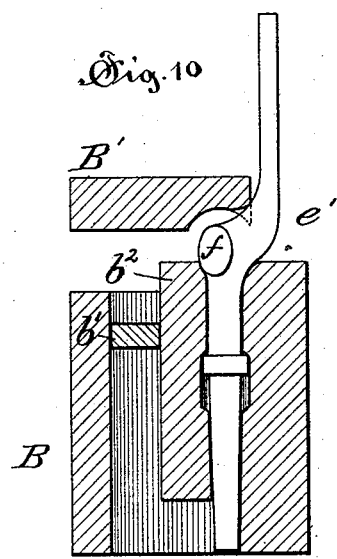
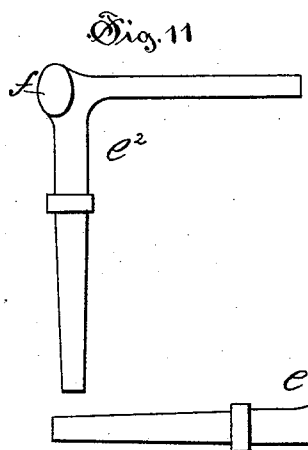
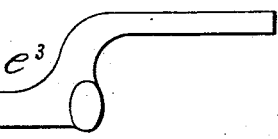
Witnesses:
Harry R. Williams
A. B. Jenkins
Inventor,
John C. Shea
by
Simonds & Burdett,
attys (No Model.) 3 Sheets—Sheet 3.
J. C. SHEA.
METHOD OF AND DIE FOR MAKING CRANK AXLES.
No. 454,073. Patented June 16, 1891.
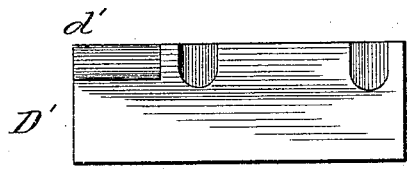
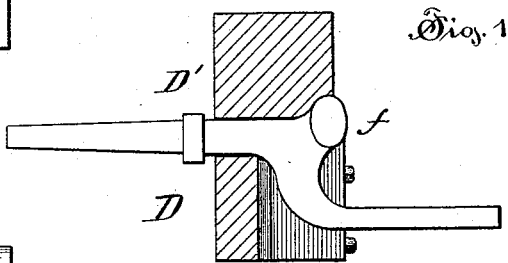
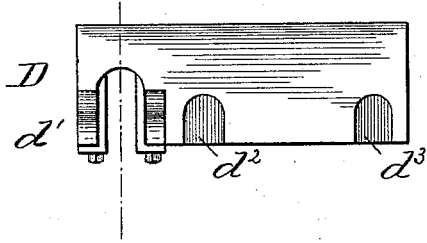
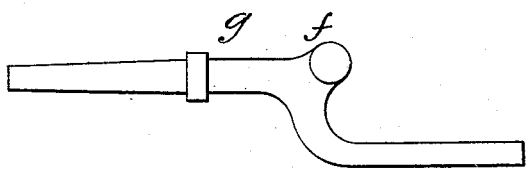
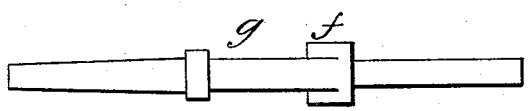
Witnesses:
Harry R. Williams,
A. B. Jenkins.
Inventor,
John C. Shea
by Simonds & Burdett,
attys

UNITED STATES PATENT OFFICE.

JOHN C. SHEA, OF NORFOLK, CONNECTICUT.

METHOD OF AND DIE FOR MAKING CRANK-AXLES.

SPECIFICATION forming part of Letters Patent No. 454,073, dated June 16, 1891.

Application filed October 26, 1888. Serial No. 289,185. (No model.)

*To all whom it may concern:*

Be it known that I, JOHN C. SHEA, of Norfolk, in the county of Litchfield and State of Connecticut, have invented certain new and useful Improvements in Dies for and Method of Making Crank-Axles, of which the following is a full, clear, and exact description, whereby any one skilled in the art can make and use the same.

The object of my invention is to provide a method and means for producing a crank-axle with all its parts integral; and to this end my invention consists in shaping, as by means of dies, from a billet of metal an axle-arm and the offset or crank-shaped bed with the spring-boss at the angle, and in the combination of the several sets of dies by means of which the axle is shaped, as more particularly hereinafter described, and pointed out in the claims.

Referring to the drawings, Figure 1 is a view in end elevation of the first set of axle-shaping dies. Fig. 2 is a view in side elevation of the same. Fig. 3 is a view in cross-section of the dies on plane denoted by line $xx$ of Fig. 2. Fig. 4 is a detail face view of the upper die. Fig. 5 is a detail face view of the lower die of the said set. Fig. 6 is a detail view of a billet with the axle-arm formed on the end thereof. Fig. 7 is a detail view of the axle at a further stage in the process of manufacture. Fig. 8 is a detail view of the axle in a still further stage in the process of manufacture. Fig. 9 is a detail top view of the lower one of a set of bending-dies. Fig. 10 is a view in vertical section through the bending-dies, showing the axle held in place and the upper die in the act of cutting the axle so that it may be bent into the shape shown in Fig. 11. Fig. 11 is a detail view of an axle after it has been bent in the dies shown in Fig. 10. Fig. 12 is a detail top view of another set of bending-dies. Fig. 13 is a view in side elevation illustrating the method of using the bending-dies. Fig. 14 is a view of the offset or crank formed. Figs. 15 and 16 are face views of the finishing-dies. Fig. 17 is a detail view in cross-section of the finishing-dies. Fig. 18 is a detail side view of the finished axle. Fig. 19 is a detail top view of the same.

In a form of crank-axle that is particularly adapted for some uses it is of advantage to form on the sides of the bed, at what may be termed the "elbow," projections that serve as a means of attachment of the springs that support the carriage-body. Such an axle with these projecting spring-lugs has been made by welding the latter to the axle, or by forming them on a piece that has been afterward welded to the bed; but such a method of making them is expensive and renders the axle weak at a point where great strength is needed. By means of my improved method and dies I have succeeded in producing a crank-axle with the arm, collar, spring-lug, and bed all integral.

In the accompanying drawings, the letters A A' denote a set of dies for breaking down and forming the bed in the first steps in the process of making a crank-axle, and I have termed them the "roughing-dies." These dies, it will be understood, are held in a suitable hammer or press, the lower one A being fast to the anvil and the upper one A' being fast to the helve or drop of the hammer or press, and by means of the working-faces $a$ $a'$ a billet $e$ of metal, on which an axle-arm has already been formed, is first reduced in size in cross-section and slightly drawn and the carriage-lugs $f$ are roughly formed. These lugs are rounded out and further formed in the cup-shaped recesses $a^3$, that have circular walls, and the end of the billet beyond the lug is drawn out to a somewhat tapered and rounded form in the grooves $a^4$, that are formed in the opposite parts of the roughing-dies. The blank is next bent to the shape shown in Fig. 8 of the drawings by means of the bending-grooves $a^5$, that are shown in plan view on the right of Figs. 4 and 5 and in cross-section in Fig. 3. This blank $e'$ is next clamped in the bending-die B, as by means of a wedge $b'$ driven through slots in the die back of the clamping-piece $b^2$, thus binding the axle-blank firmly in place, the lugs $f$ resting in the recesses $b^3$, formed in the upper surface of the clamping-piece $b^2$, the sides of which overhang the base of the die and form an anvil or rest that supports the blank, while the upper cutting and forming die B' cuts into the blank back of the lugs, the cut being made in a position and to an extent depending upon the exact shape that it may be desired to give to the axle and to the lugs. As soon as the proper cut has been made the upper end of the blank is grasped by a suitable lever, and the blank is bent down until that part of the bed back of the lugs $f$ stands at about at right angles to the axle-arm, as shown in Fig. 11. This blank $e^2$ is next clamped in the bending-die C, as by means of the wedge $c$, and the axle-bed is bent and a crank or offset formed, as shown, by the blank $e^3$, a portion of the bed then being fixed parallel to the axis of the axle-arm and offset from it any desired distance, depending upon the shape of the bending-die C. The axle-blank $e^3$ is next submitted to several operations in the finishing-dies D D', the curved parts $d'$ $d^2$ $d^3$ serving to round up and finish the spring-lugs $f$, the result of the several steps herein described and of the several dies being the production of a crank-axle $g$, that is ready for use or sale to the carriage-maker.

It is to be understood that the billet and the blank are to be properly heated in order to enable the metal to be properly forged and manipulated in the several successive steps in the process of making it.

I claim as my invention—

1. The within-described method of making a crank-axle, that consists in first forming an axle-arm on one end of a billet of metal, then forming the laterally-projecting spring-lugs, then bending the axle-bed to form the offset, and then finishing the lugs and axle-bed by means of dies, all substantially as described.

2. The combination of the roughing-dies A A' with the several blank forming and bending grooves, the bending-dies B, with means for clamping and holding a blank, the bending-dies C, and the finishing-dies D D', all substantially as described.

3. In combination with the roughing-dies A A', having the faces $a$ $a'$, the grooves $a^4$ $a^6$, recesses $a^3$, the bending-dies, by means of which an offset is formed in the axle-bed, and the finishing-dies D D', all substantially as described.

JOHN C. SHEA.

Witnesses:
CHAS. L. BURDETT,
HIRAM BUCKINGHAM.